United States Patent
Murai

(10) Patent No.: US 12,198,861 B2
(45) Date of Patent: Jan. 14, 2025

(54) CERAMIC ELECTRONIC DEVICE AND MANUFACTURING METHOD OF THE SAME

(71) Applicant: TAIYO YUDEN CO., LTD., Tokyo (JP)

(72) Inventor: Wakaaki Murai, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 236 days.

(21) Appl. No.: 17/891,936

(22) Filed: Aug. 19, 2022

(65) Prior Publication Data

US 2023/0070005 A1     Mar. 9, 2023

(30) Foreign Application Priority Data

Aug. 31, 2021 (JP) ................................. 2021-140621

(51) Int. Cl.
  *H01G 4/248* (2006.01)
  *H01G 4/012* (2006.01)
  *H01G 4/30* (2006.01)

(52) U.S. Cl.
  CPC ............... *H01G 4/30* (2013.01); *H01G 4/012* (2013.01); *H01G 4/248* (2013.01)

(58) Field of Classification Search
  CPC ........... H01G 4/30; H01G 4/012; H01G 4/248
  See application file for complete search history.

(56) References Cited

U.S. PATENT DOCUMENTS

| | | | |
|---|---|---|---|
| 10,991,512 B2 * | 4/2021 | Park | H01G 4/12 |
| 2010/0128412 A1 * | 5/2010 | Nishihara | H01G 4/30 361/306.3 |
| 2015/0083475 A1 | 3/2015 | Kim et al. | |
| 2016/0093437 A1 * | 3/2016 | Itamura | H01G 4/012 361/301.4 |
| 2016/0093438 A1 * | 3/2016 | Sasabayashi | H01G 4/12 361/301.4 |
| 2021/0005383 A1 * | 1/2021 | Park | H01G 4/224 |
| 2021/0005391 A1 * | 1/2021 | Park | H01G 4/2325 |
| 2021/0035744 A1 * | 2/2021 | Atsumi | H01G 4/30 |
| 2021/0065980 A1 * | 3/2021 | Jung | H01G 4/30 |
| 2022/0157529 A1 * | 5/2022 | Jung | H01G 4/12 |

FOREIGN PATENT DOCUMENTS

| | | |
|---|---|---|
| JP | 2015065394 A | 4/2015 |
| JP | 2016058719 A | 4/2016 |
| JP | 2018110201 A | 7/2018 |

* cited by examiner

*Primary Examiner* — Dion R. Ferguson
(74) *Attorney, Agent, or Firm* — Law Office of Katsuhiro Arai

(57) ABSTRACT

A ceramic electronic component includes a multilayer chip having a structure in which dielectric layers and internal electrode layers are alternately stacked, a main component of the dielectric layers being ceramic, the internal electrode layers being alternately exposed to two surface regions of the multilayer chip, and external electrodes, each of which is provided on each of the two surface regions. At least a part of each of the external electrodes has a first metal layer contacting the multilayer chip and a plated layer provided on the first metal layer. The first metal layer includes a first metal and a second metal having a Young's modulus smaller than that of the first metal.

10 Claims, 9 Drawing Sheets

US 12,198,861 B2

CERAMIC ELECTRONIC DEVICE AND MANUFACTURING METHOD OF THE SAME

CROSS-REFERENCE TO RELATED APPLICATION

This application is based upon and claims the benefit of priority of the prior Japanese Patent Application No. 2021-140621, filed on Aug. 31, 2021, the entire contents of which are incorporated herein by reference.

FIELD

A certain aspect of the present invention relates to a ceramic electronic device and a manufacturing method of the ceramic electronic device.

BACKGROUND

Ceramic electronic devices such as multilayer ceramic capacitors include a multilayer chip in which dielectric layers and internal electrode layers are alternately stacked, and a plurality of stacked internal electrode layers are alternately exposed to a plurality of parts. And, external electrodes are provided at the plurality of parts (see, for example, Japanese Patent Application Publication No. 2015-65394).

SUMMARY OF THE INVENTION

However, the external electrodes may be peeled from the multilayer chip.

According to an aspect of the present invention, there is provided a ceramic electronic component including: a multilayer chip having a structure in which dielectric layers and internal electrode layers are alternately stacked, a main component of the dielectric layers being ceramic, the internal electrode layers being alternately exposed to two surface regions of the multilayer chip; and external electrodes, each of which is provided on each of the two surface regions, wherein at least a part of each of the external electrodes has a first metal layer contacting the multilayer chip and a plated layer provided on the first metal layer, and wherein the first metal layer includes a first metal and a second metal having a Young's modulus smaller than that of the first metal.

According to another aspect of the present invention, there is provided a manufacturing method of a ceramic electronic device including: preparing a multilayer chip having a structure in which dielectric layers and internal electrode layers are alternately stacked, a main component of the dielectric layers being ceramic, the internal electrode layers being alternately exposed to two surface regions of the multilayer chip; and forming a metal layer that contacts the multilayer chip and is electrically connected to the internal electrode layers exposed to the two surface regions, by sputtering or vapor deposition; and forming a plated layer on the metal layer, wherein the metal layer includes a first metal and a second metal having a Young's modulus smaller than that of the first metal.

DETAILED DESCRIPTION

A description will be given of an embodiment with reference to the accompanying drawings.

Figure 1:
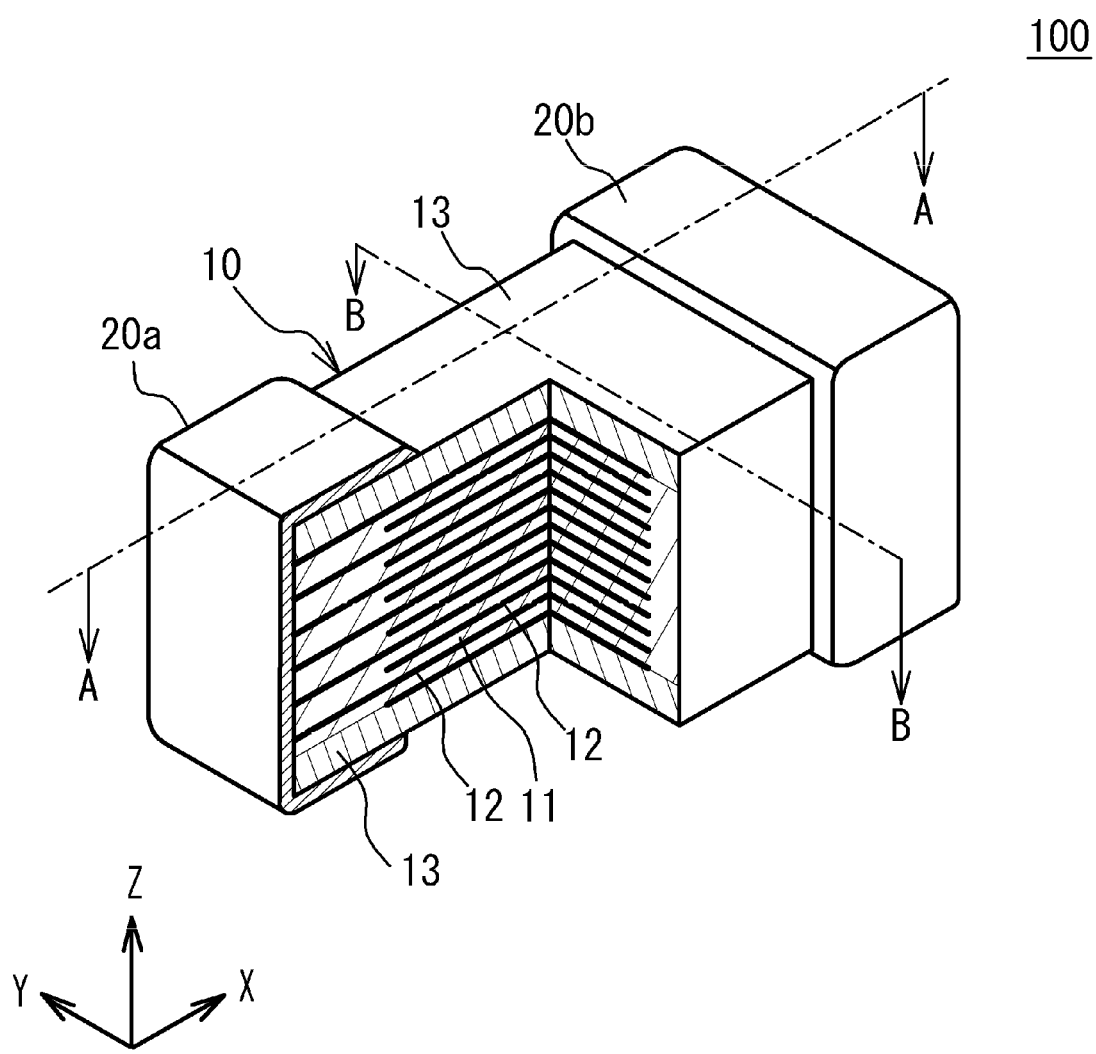
FIG. 1 illustrates a perspective view of a multilayer ceramic capacitor in which a cross section of a part of the multilayer ceramic capacitor is illustrated.
Figure 2:
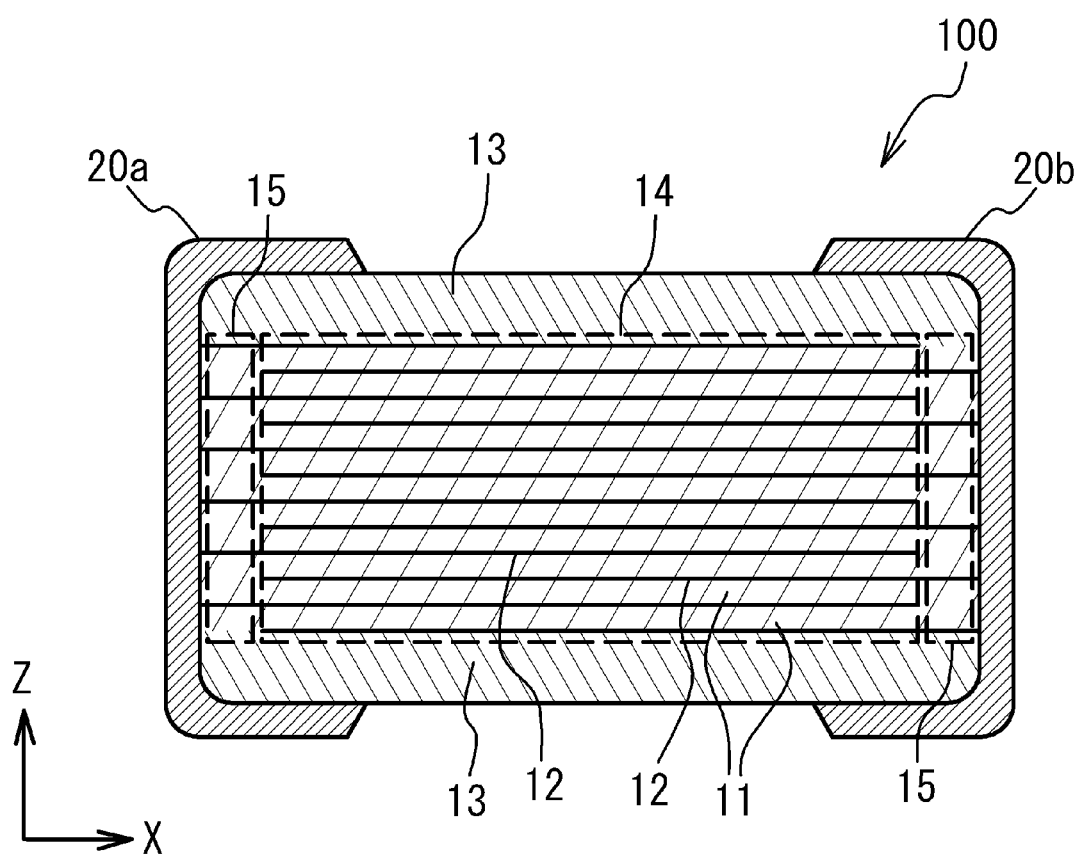
FIG. 2 illustrates a cross sectional view taken along a line A-A of FIG. 1.
Figure 3:
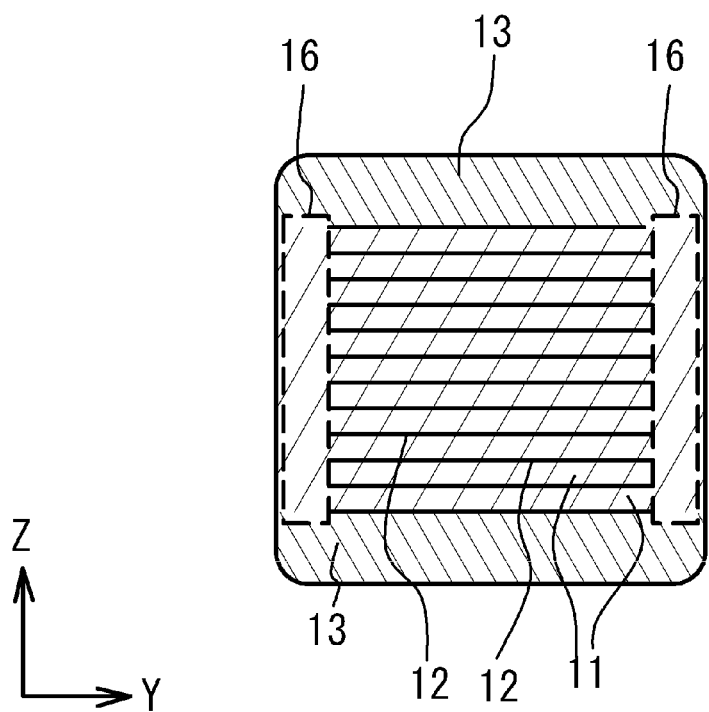
FIG. 3 illustrates a cross sectional view taken along a line B-B of FIG. 1.

(Embodiment) FIG. 1 illustrates a perspective view of a multilayer ceramic capacitor 100 in accordance with an embodiment, in which a cross section of a part of the multilayer ceramic capacitor 100 is illustrated. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

In FIG. 1 to FIG. 3, an X-axis direction is a longitudinal direction of the multilayer chip 10. The X-axis direction is a direction in which the external electrode 20a is opposite to the external electrode 20b. A Y-axis direction is a width direction of the internal electrode layers. The Y-axis direction is a direction in which the two side faces of the multilayer chip 10 are opposite to each other. A Z-axis direction is a stacking direction. The Z-axis direction is a direction in which the upper face of the multilayer chip 10 is opposite to the lower face of the multilayer chip 10. The X-axis direction, the Y-axis direction and the Z-axis direction are vertical to each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first end face of the multilayer chip 10 and a second end face of the multilayer chip 10 that is different from the first end face. In the embodiment, the first end face is opposite to the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In a multilayer structure of the dielectric layers 11 and the internal electrode layers 12, two of the internal electrode layers 12 are positioned at outermost layers in a stacking direction. The upper face and the lower face of the multi-layer structure that are the internal electrode layers 12 are covered by cover layers 13. A main component of the cover layer 13 is a ceramic material. For example, a main component of the cover layer 13 is the same as that of the dielectric layer 11.

For example, the size of the multilayer ceramic capacitor 100 is, for example, a length of 1.0±0.05 mm in the X-axis direction, a width of 0.5±0.05 mm in the Y-axis direction, and a height of 0.0975±0.0125 mm in the Z-axis direction. The size may be a length of 0.6 mm in the X-axis direction, a width of 0.3 mm in the Y-axis direction and a height of 0.110 mm in the Z-axis direction. The size may be a length of 1.0 mm in the X-axis direction, a width of 0.5 mm in the Y-axis direction and a height of 0.1 mm in the Z-axis direction. However, the size is not limited.

The internal electrode layer 12 is mainly composed of a base metal such as nickel (Ni), copper (Cu), or tin (Sn). The internal electrode layer 12 may be composed of a noble metal such as platinum (Pt), palladium (Pd), silver (Ag), or gold (Au) or alloy including one or more of them. For example, each thickness of the internal electrode layers 12 may be 0.1 μm or more and 3 μm or less, 0.1 μm or more and 1 μm or less, or 0.1 μm or more and 0.5 μm or less.

A main component of the dielectric layer 11 is a ceramic material having a perovskite structure expressed by a general formula $ABO_3$. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $MgTiO_3$ (magnesium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure. $Ba_{1-x-y}Ca_xSr_yTi_{1-z}Zr_zO_3$ may be barium strontium titanate, barium calcium titanate, barium zirconate, barium titanate zirconate, calcium titanate zirconate, barium calcium titanate zirconate or the like. Each thickness of the dielectric layers 11 may be 0.05 μm or more and 5 μm or less, 0.1 μm or more and 3 μm or less, or 0.2 μm or more and 1 μm or less.

As illustrated in FIG. 2, a section, in which a set of the internal electrode layers 12 connected to the external electrode 20a face another set of the internal electrode layers 12 connected to the external electrode 20b, is a section generating electrical capacity in the multilayer ceramic capacitor 100. Accordingly, the section is referred to as a capacity section 14. That is, the capacity section 14 is a section in which the internal electrode layers next to each other being connected to different external electrodes face each other.

A section, in which the internal electrode layers 12 connected to the external electrode 20a face each other without sandwiching the internal electrode layer 12 connected to the external electrode 20b, is referred to as an end margin 15. A section, in which the internal electrode layers 12 connected to the external electrode 20b face each other without sandwiching the internal electrode layer 12 connected to the external electrode 20a is another end margin 15. That is, the end margin 15 is a section in which a set of the internal electrode layers 12 connected to one external electrode face each other without sandwiching the internal electrode layer 12 connected to the other external electrode. The end margins 15 are sections that do not generate electrical capacity in the multilayer ceramic capacitor 100.

As illustrated in FIG. 3, a section of the multilayer chip 10 from the two sides thereof to the internal electrode layers 12 is referred to as a side margin 16. That is, the side margin 16 is a section covering edges of the stacked internal electrode layers 12 in the extension direction toward the two side faces. The side margin 16 does not generate electrical capacity.

Figure 4:
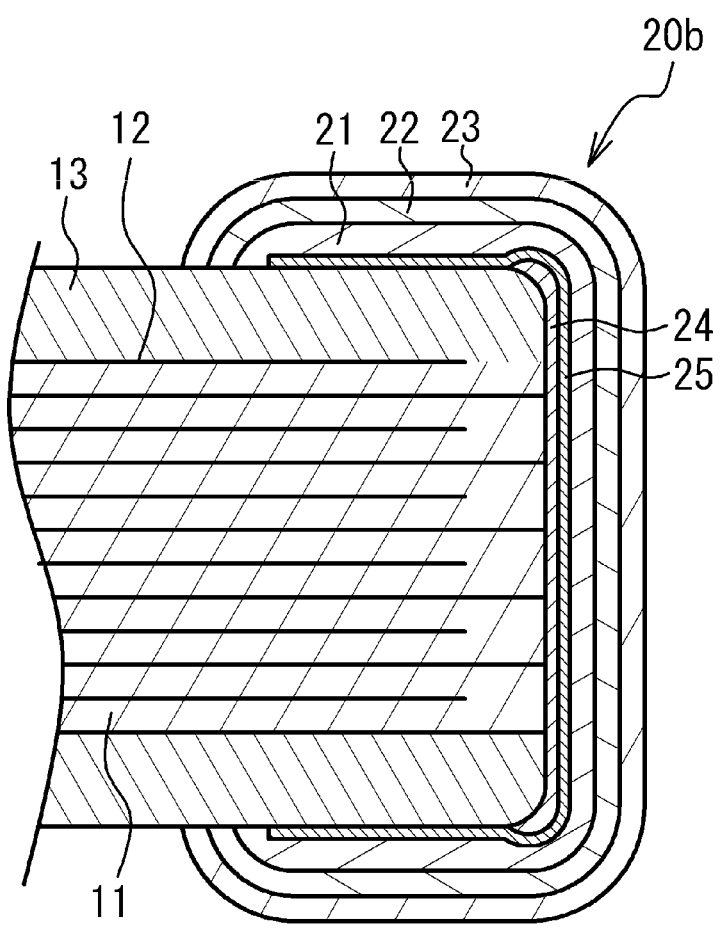
FIG. 4 is a cross-sectional view of an external electrode, and is a partial cross-sectional view taken along a line A-A of FIG. 1.

FIG. 4 is a cross-sectional view of the external electrode 20b, and is a partial cross-sectional view taken along the line A-A of FIG. In FIG. 4, the hatch representing the cross section is omitted. As illustrated in FIG. 4, the external electrode 20b has a structure in which a plated layer is formed on a base layer 24. The plated layer includes, for example, a first plated layer 21 such as Cu, a second plated layer 22 such as Ni, and a third plated layer 23 such as Sn from the base layer 24 side.

The base layer 24 is provided so as to be in contact with the end face of the multilayer chip 10 and cover the end face. The base layer 24 may extend to the two side surfaces, the upper surface, and the lower surface of the multilayer chip 10 from the end surface toward the opposite end surface. A main component of the base layer 24 is such as Cu, Ni, Al (aluminum), or Zn (zinc). The base layer 24 may include a glass component for densification of the base layer 24 and a co-material for controlling the sinterability of the base layer 24. The base layer 24 containing a large amount of these ceramic components has good adhesion to the dielectric layer 11 and the cover layer 13 containing the ceramic material as a main component. The external electrode 20a also has the same multilayer structure as that of the external electrode 20b.

A first metal layer 25 is provided between the base layer 24 and the plated layer. The first metal layer 25 covers the surface of the base layer 24 on the plated layer side. The first metal layer 25 extends to the two side surfaces, the upper surface, and the lower surface of the multilayer chip 10 toward the opposite end face. The first metal layer 25 extends beyond the base layer 24 to the opposite end face side. In the region where the first metal layer 25 extends beyond the base layer 24 toward the opposite end face, the first metal layer 25 is provided in contact with the surface of the multilayer chip 10, and the plated layer is in contact with the first metal layer 25. For example, the first metal layer 25 is provided in contact with the surfaces of the cover layer 13 and the side margin 16 in the region where the base layer 24 is not provided. Since the first metal layer 25 is in contact with the base layer 24, the first metal layer 25 is also electrically connected to the internal electrode layers. The external electrode 20a also has the same multilayer structure as that of the external electrode 20b.

In the region where the base layer 24 is not provided, the first metal layer 25 functions as a seed layer in the plating process. Therefore, by providing the first metal layer 25 in the region where the base layer 24 is not provided, it is possible to suppress the peeling of the plated layer.

Figure 5:
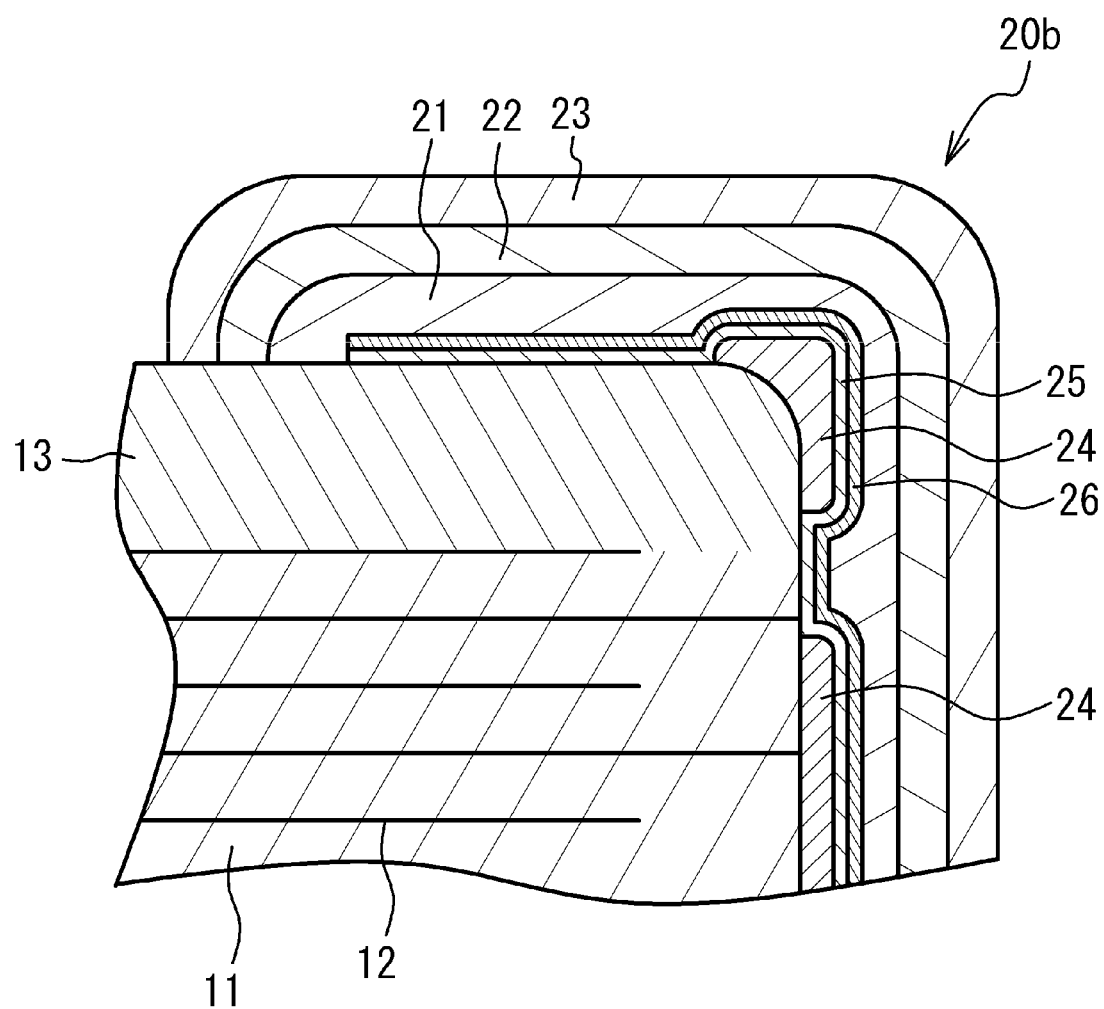
FIG. 5 illustrates a partial enlarged view of FIG. 4.

Even in the region where the base layer 24 is provided, the base layer 24 may be partially formed and there may be a break (hole, etc.). For example, when the base layer 24 is formed by firing a metal paste, the metal paste may not necessarily adhere to a part of the surface of the multilayer chip 10 due to cissing or the like. In this case, as illustrated in FIG. 5, there is a possibility that the base layer 24 is not formed at the portion where the metal paste does not adhere. At the location where the base layer 24 is not formed, the plated layer may peel off from the multilayer chip 10. However, in the present embodiment, since the first metal layer 25 is provided at the portion where the base layer 24 is not formed, it is possible to suppress the peeling of the plated layer.

The first metal layer 25 contains, for example, a first metal such as titanium (Ti) as a main component. However, Ti has a large Young's modulus of about 106 GPa. Therefore, in the plating process and the subsequent handling process, the flexibility is insufficient against the impact of the multilayer ceramic capacitors colliding with each other, and the external electrodes 20a and 20b may be peeled off. Therefore, in the present embodiment, the first metal layer 25 contains a second metal having a Young's modulus smaller than that of the first metal. As a result, the Young's modulus of the first metal layer 25 as a whole is lowered, and the first metal layer 25 can be made flexible. Therefore, peeling of the external electrodes 20a and 20b can be suppressed. Table 1 exemplifies Young's modulus of each metal.

metal layer 26 is provided from the viewpoint of adhesion of the plated layer. For example, it is preferable to use the same metal as the first plated layer 21 as the second metal layer 26. Since Cu has a function of preventing the invasion of hydrogen, it is preferable that both the first plated layer 21 and the second metal layer 26 are Cu.

When the base layer 24 is thinned from the viewpoint of suppressing the thickness of the external electrodes 20a and 20b, a break is likely occur in the base layer 24 and the effect of providing the first metal layer 25 becomes remarkable. For example, when the thickness of the base layer 24 is 0.1 μm or more and 10 μm or less, 0.2 μm or more and 5 μm or less, and 0.5 μm or more and 3 μm or less, the effect of providing the first metal layer 25 becomes remarkable.

TABLE 1

|  | Ti | Sn | Al | Au | Ag | Pb | Bi | Zn | In | Ni | Cu |
| --- | --- | --- | --- | --- | --- | --- | --- | --- | --- | --- | --- |
| YOUNG'S MODULUS (Gpa) | 115.7 | 49.9 | 70.3 | 78.0 | 82.7 | 16.1 | 3.19 | 108.4 | 11.0 | 219.2 | 129.8 |

From the viewpoint of increasing the flexibility of the first metal layer 25, it is preferable that the Young's modulus of the second metal is small. For example, the Young's modulus of the second metal is preferably ⅔ or less, more preferably ½ or less, and even more preferably ⅓ or less of the Young's modulus of the first metal.

If the amount of the second metal in the first metal layer 25 is too large, there is a risk of melting. Therefore, it is preferable to set an upper limit on the amount of the second metal in the first metal layer 25. For example, when (first metal+second metal) is 100 at %, the amount of the second metal is preferably 20 at % or less, more preferably 5 at % or less, and still more preferably 1 at % or less.

For example, the resistance value of Ti is about 20 to 30 times of the resistance value of Cu. Therefore, when the first metal layer 25 is thickly formed, there is a risk of connection failure. Therefore, it is preferable to set an upper limit on the thickness of the first metal layer 25. For example, the thickness of the first metal layer 25 is preferably 100 nm or less, more preferably 75 nm or less, and even more preferably 50 nm or less.

On the other hand, when the first metal layer 25 is thinly formed, there is a risk of peeling. Therefore, it is preferable to set a lower limit for the thickness of the first metal layer 25. For example, the thickness of the first metal layer 25 is preferably 5 nm or more, more preferably 10 nm or more, and further preferably 20 nm or more.

For example, it is preferable to use Ti as the first metal. This is because a Ti—O bonded state is formed between the first metal and barium titanate acting a base, and when the first plated layer 21 is Cu, a Ti—Cu bonded state is created to improve the adhesion. In addition, it is preferable to use Cr or the like as the first metal. This is because the first metal creates a bonded state of Cr—O and Cr—Cu.

For example, it is preferable to use tin (Sn) as the second metal. This is because peeling is suppressed by using a material having a small Young's modulus. In addition, it is preferable to use In or the like as the second metal. This is because the atomic number is close to Sn, and the mechanical and electrical properties are similar to Sn.

As illustrated in FIG. 5, a second metal layer 26 or the like may be provided between the first metal layer 25 and the plated layer. For example, the second metal layer 26 may be provided so as to cover the first metal layer 25. The second In each of the external electrodes 20a and 20b, on the upper surface, the lower surface, and the two side surfaces of the multilayer chip 10, the length of the region in the X-axis direction where the base layer 24 is not provided and the first metal layer 25 is in contact with the multilayer chip 10 is, for example, 1/10 or more and 4/10 or less with respect to the length of the multilayer ceramic capacitor 100 in the X-axis direction.

Figure 6:
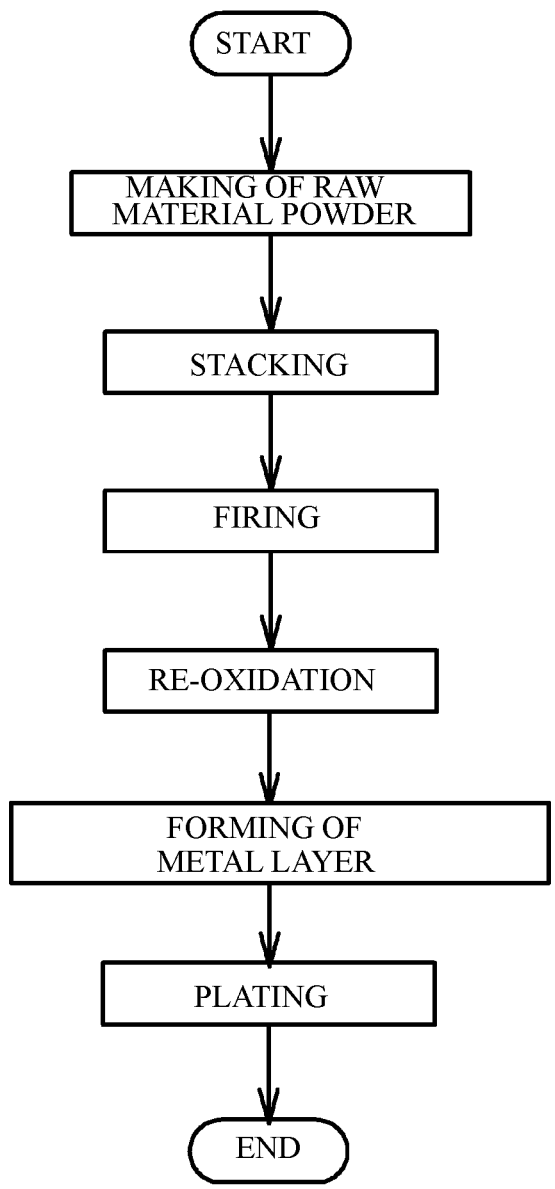
FIG. 6 illustrates a manufacturing method of a multilayer ceramic capacitor

Next, a description will be given of a manufacturing method of the multilayer ceramic capacitors 100. FIG. 6 illustrates a manufacturing method of the multilayer ceramic capacitor 100.

(Making process of raw material powder) A dielectric material for forming the dielectric layer 11 is prepared. The dielectric material includes the main component ceramic of the dielectric layer 11. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiments may use any of these methods.

An additive compound may be added to the resulting ceramic powder, in accordance with purposes. The additive compound may be an oxide of Sn (tin), Mg (magnesium), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium)), or an oxide of Co (cobalt), Ni (nickel), Li (lithium), B (boron), Na (sodium), K (potassium) and Si (silicon). The additive compound may be a glass including cobalt, nickel, lithium, boron, sodium, potassium or silicon.

For example, the resulting ceramic raw material powder is wet-blended with additives and is dried and crushed. Thus, a ceramic material is obtained. For example, the grain diameter may be adjusted by crushing the resulting ceramic material as needed. Alternatively, the grain diameter of the resulting ceramic power may be adjusted by combining the crushing and classifying. With the processes, a dielectric material is obtained.

(Stacking process) Next, a binder such as polyvinyl butyral (PVB) resin, an organic solvent such as ethanol or toluene, and a plasticizer are added to the resulting dielectric material and wet-blended. With use of the resulting slurry, a dielectric green sheet 52 is painted on a base material 51 by, for example, a die coater method or a doctor blade method, and then dried. The base material 51 is, for example, PET (polyethylene terephthalate) film.

Figure 7A:
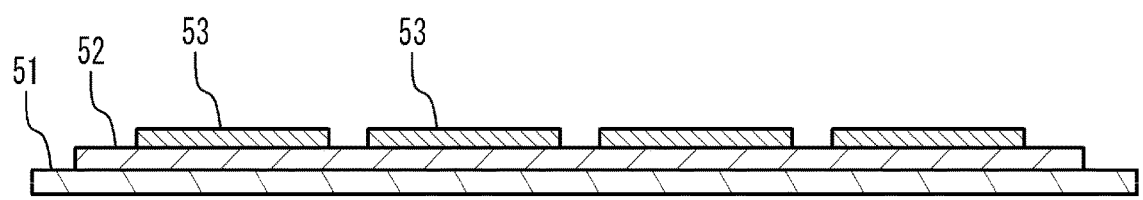
FIG. 7A and FIG. 7B illustrate a stacking process.

Next, as illustrated in FIG. 7A, an internal electrode pattern 53 is formed on the dielectric green sheet 52. In FIG. 7A, as an example, four parts of the internal electrode pattern 53 are formed on the dielectric green sheet 52 and are spaced from each other. The forming method is not limited. For example, an electrode paste including the main component metal of the internal electrode layers 12 is used. Alternatively, a vacuum deposition method such as a sputtering method using a target of the main component metal of the internal electrode layers 12 may be performed. The dielectric green sheet 52 on which the internal electrode pattern 53 is formed is a stack unit.

Figure 7B:
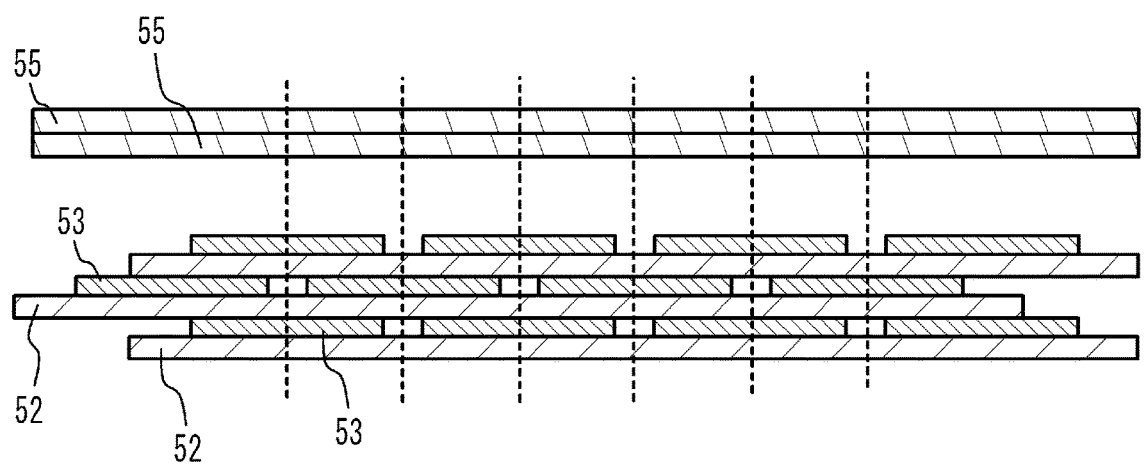

Next, the dielectric green sheets 52 are peeled from the base materials 51. As illustrated in FIG. 7B, the stack units are stacked. A predetermined number (for example, 2 to 10) of a cover sheet is stacked on an upper face and a lower face of a ceramic multilayer structure of the stacked stack units and is thermally crimped. The resulting ceramic multilayer structure is cut into a chip having a predetermined size (for example, 1.0 mm×0.5 mm). In FIG. 7B, the multilayer structure is cut along a dotted line. The components of a cover sheet 55 may be the same as those of the dielectric green sheet 52. Additives of the cover sheet 55 may be different from those of the dielectric green sheet 52.

Figure 8A:
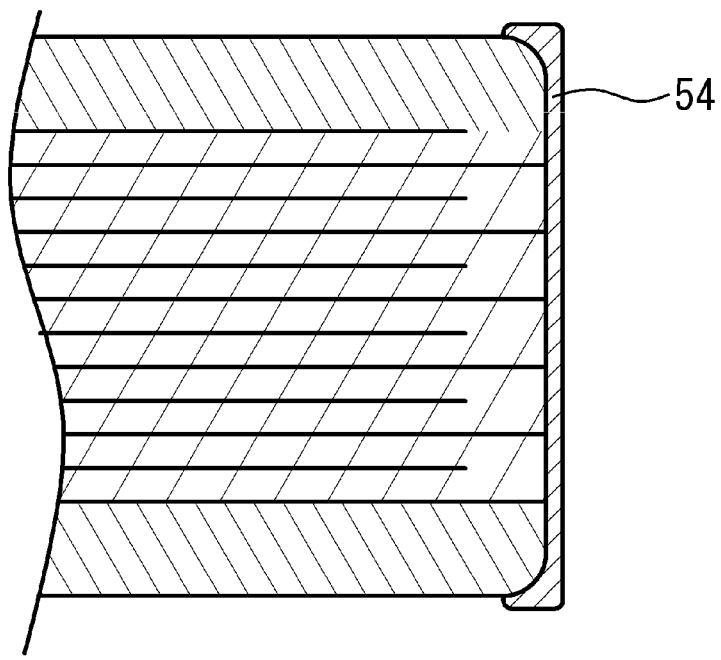
FIG. 8A illustrates applying of a metal paste.

(Firing process) The binder is removed from the ceramic multilayer structure in $N_2$ atmosphere. As illustrated in FIG. 8A, a metal paste 54 to be the base layers 24 of the external electrodes 20a and 20b is applied to the both end faces of the ceramic multilayer structure by a dipping method. The resulting ceramic multilayer structure is fired for 10 minutes to 2 hours in a reductive atmosphere having an oxygen partial pressure of $10^5$ to $10^{-8}$ atm in a temperature range of 1100 degrees C. to 1300 degrees C.

(Re-oxidizing process) After that, a re-oxidizing process may be performed in $N_2$ gas atmosphere in a temperature range of 600 degrees C. to 1000 degrees C.

Figure 8B:
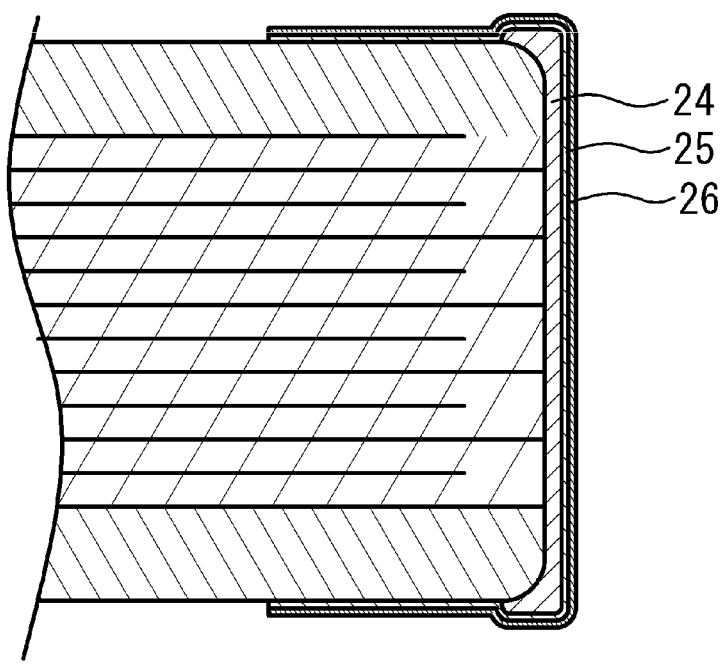
FIG. 8B illustrates a forming process of a metal layer.

(Metal layer forming process) Next, the region where the external electrodes 20a and 20b are provided left and the rest region is covered with a metal mask, and the first metal layer 25 is formed as illustrated in FIG. 8B. Sputtering or vapor deposition can be used as the film forming method. The vapor deposition may be chemical vapor deposition or physical vapor deposition. For example, the first metal layer 25 can be formed by using an alloy of the first metal and the second metal contained in the first metal layer 25 as a target. As illustrated in FIG. 8B, the second metal layer 26 may be formed so as to cover the first metal layer 25. The second metal layer 26 can also be formed by sputtering or vapor deposition.

(Plating process) After that, the first metal layer 25 is used as a seed layer by the plating process to form the first plated layer 21, the second plated layer 22, and the third plated layer 23. When the second metal layer 26 is provided, the second metal layer 26 is used as a seed layer.

According to the manufacturing method according to the present embodiment, since the first metal layer 25 is formed by sputtering or vapor deposition, a dense film having high purity is formed as compared with the case where Ni paste is applied by a dip method or the like. As a result, the conductivity of the first metal layer 25 becomes good, and the growth of the plated layer can be accelerated. Further, since the first metal layer 25 is formed by sputtering or vapor deposition, the first metal layer 25 can be formed even at the break where the metal paste 54 did not adhere due to cissing or the like. Therefore, peeling of the plated layer can be suppressed even at the break of the metal paste 54. Further, since the first metal layer 25 contains a second metal having a Young's modulus smaller than that of the first metal, the Young's modulus of the first metal layer 25 as a whole is lowered, and the first metal layer 25 is made flexible. Therefore, peeling of the external electrodes 20a and 20b can be suppressed.

The base layer 24 may be formed after the multilayer chip 10 is obtained by firing. For example, the metal paste 54 for forming the base layer containing the metal powder, the glass frit, the binder, and the solvent may be applied to both end faces of the multilayer chip 10, dried, and the metal paste for forming the base layer may be fired. The base layer 24 may be formed in this way.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

The multilayer ceramic capacitors in accordance with the embodiment were made and the property was measured.

An additive was added to barium titanate powder. The additive and the barium titanate powder were sufficiently wet-blended and crushed in a ball mill. Thus, a dielectric material was made. Butyral-based material acting as an organic binder, and toluene and ethanol acting as a solvent were added to the dielectric material. And, the dielectric green sheet was made on a base material of PET by a doctor blade method. Next, an internal electrode pattern was formed on the dielectric green sheet by using a paste including Ni powder.

Next, while peeling off the dielectric green sheet from the base material, the stack units were stacked. Next, a predetermined number of cover sheets were stacked on the upper and lower faces of the multilayer structure by stacking the stack units, and thermally crimped. Then, the resulting multilayer structure was cut to a predetermined chip size.

The ceramic multilayer structure thus obtained was subjected to a binder removal treatment in an $N_2$ atmosphere, then a metal paste to be a base layer of an external electrode was applied by a dip method, and the ceramic multilayer structure was fired in a reducing atmosphere.

After firing, the area where the external electrode was provided was left and the rest area was covered with a metal mask, and a Ti metal layer was formed by sputtering. An alloy of Ti and Sn was used as the target. In the alloy, when Ti was set to 100 at %, Sn was set to 20 at %. The thickness of the Ti metal layer was 0.05 µm. Then, a Cu layer was formed on the Ti metal layer by sputtering. The thickness of the Cu layer was 0.4 µm. Then, a Cu layer having a thickness of 5 µm, a Ni layer having a thickness of 3 µm, and a Sn layer having a thickness of 2 µm were formed by plating in order.

Figure 9A:
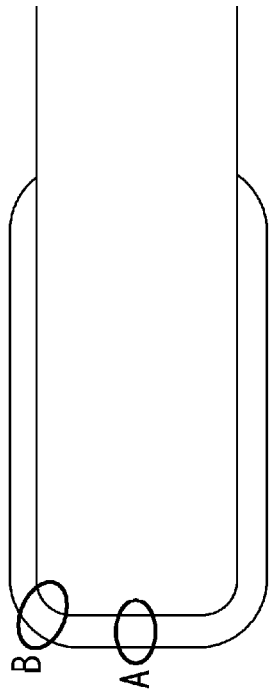
FIG. 9A is a traced SEM photograph of a cross section.
Figure 9B:
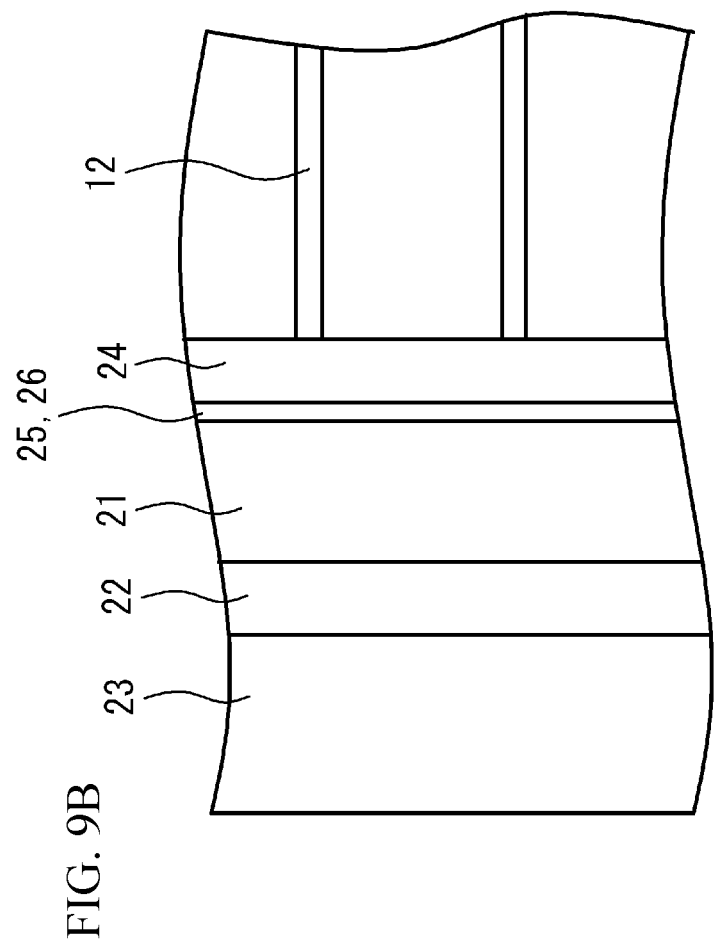
FIG. 9B is an enlarged view of a portion A.

FIG. 9A is a traced SEM photograph of a cross section. FIG. 9B is an enlarged view of a portion A of FIG. 9A. FIG.

Figure 9C:
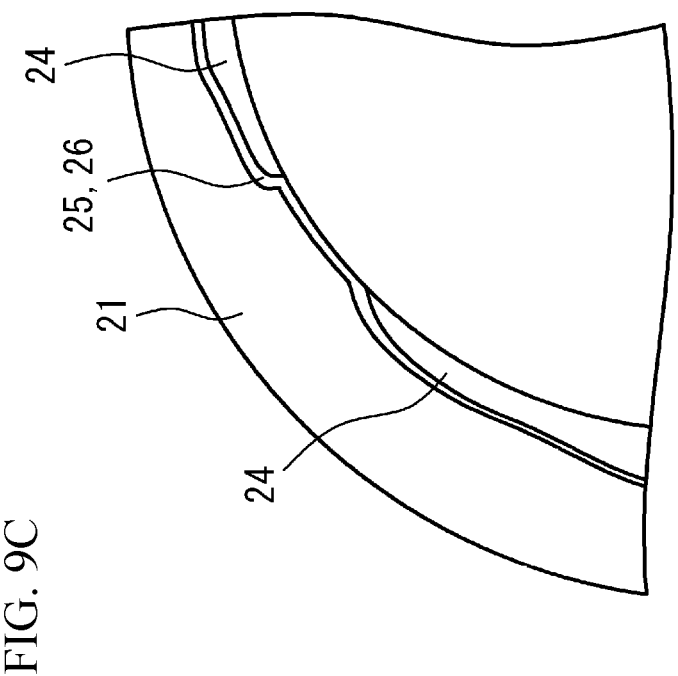
FIG. 9C is an enlarged view of a portion B.

9C is an enlarged view of a portion B of FIG. 9A. As shown in FIG. 9B, the first metal layer 25 of Ti and the second metal layer 26 of Cu were formed on the base layer 24. The first plated layer 21 of Cu, the second plater layer of Ni, and the third plated layer 23 of Sn were formed on the second metal layer 26 in this order. Further, as shown in FIG. 9C, the first metal layer 25 of Ti was formed in contact with the surface of the multilayer chip in a region where the base layer 24 should originally be formed but was not formed. In this manner, it was found that the first metal layer 25 can be formed by sputtering on the region where the base layer 24 was not formed.

Although the embodiments of the present invention have been described in detail, it is to be understood that the various change, substitutions, and alterations could be made hereto without departing from the spirit and scope of the invention.

What is claimed is:

1. A ceramic electronic component comprising:
    a multilayer chip having a structure in which dielectric layers and internal electrode layers are alternately stacked, a main component of the dielectric layers being ceramic, the internal electrode layers being alternately exposed to two surface regions of the multilayer chip; and
    external electrodes, each of which is provided on each of the two surface regions,
    wherein:
    at least a part of each of the external electrodes has a first metal layer contacting the multilayer chip and a plated layer provided on the first metal layer,
    the first metal layer includes a first metal and a second metal having a Young's modulus smaller than that of the first metal,
    each of the external electrodes has a structure in which the plated layer is provided on a base layer contacted to each of the two surface regions, and
    the first metal layer contacts the multilayer chip, in a break portion of the base layer.

2. The ceramic electronic device as claimed in claim 1, wherein a Young's modulus of the second metal is ⅔ or less of that of the first metal.

3. The ceramic electronic device as claimed in claim 1, wherein an amount of the second metal is 1 at % or less on a presumption that an amount of the first metal is 100 at %, in the first metal layer.

4. The ceramic electronic device as claimed in claim 1, wherein the first metal is Ti or Cr.

5. The ceramic electronic device as claimed in claim 1, wherein the second metal is Sn or In.

6. The ceramic electronic device as claimed in claim 1, wherein a thickness of the first metal layer is 5 nm or more and 100 nm or less.

7. The ceramic electronic device as claimed in claim 1 further comprising:
    a second metal layer provided between the first metal layer and the plated layer.

8. The ceramic electronic device as claimed in claim 1, wherein a main component of the dielectric layers is barium titanate.

9. A manufacturing method of a ceramic electronic device comprising:
    preparing a multilayer chip having a structure in which dielectric layers and internal electrode layers are alternately stacked, a main component of the dielectric layers being ceramic, the internal electrode layers being alternately exposed to two surface regions of the multilayer chip;
    forming a metal layer that contacts the multilayer chip and is electrically connected to the internal electrode layers exposed to one of the two surface regions, by sputtering or vapor deposition; and
    forming a plated layer on the metal layer,
    wherein:
    the metal layer includes a first metal and a second metal having a Young's modulus smaller than that of the first metal,
    the metal layer has a structure in which the plated layer is provided on a base layer contacted to the one of the two surface regions, and
    the metal layer contacts the multilayer chip, in a break portion of the base layer.

10. A ceramic electronic component comprising:
    a multilayer chip having a structure in which dielectric layers and internal electrode layers are alternately stacked, a main component of the dielectric layers being ceramic, the internal electrode layers being alternately exposed to two surface regions of the multilayer chip; and
    external electrodes, each of which is provided on each of the two surface regions,
    wherein:
    at least a part of each of the external electrodes has a first metal layer contacting the multilayer chip and a plated layer provided on the first metal layer,
    the first metal layer includes a first metal and a second metal having a Young's modulus smaller than that of the first metal, and
    a thickness of the first metal layer is 5 nm or more and 100 nm or less.

* * * * *